May 12, 1953
D. A. BAIRD
2,638,119
BRAKE HOLDING DEVICE
Filed Nov. 25, 1947
2 Sheets-Sheet 1
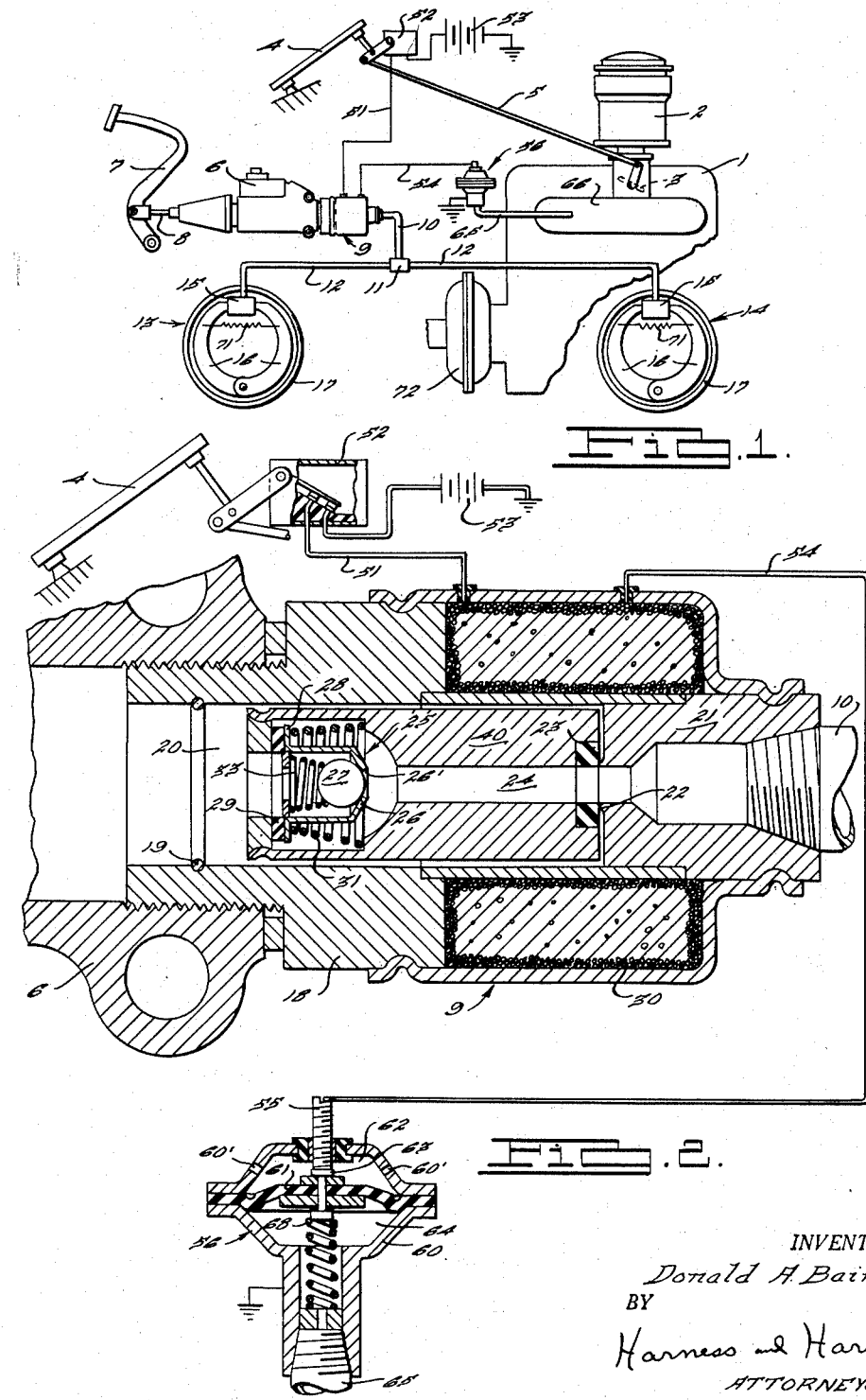
INVENTOR.
Donald A. Baird.
BY
Harness and Harris
ATTORNEYS.

May 12, 1953 D. A. BAIRD 2,638,119
BRAKE HOLDING DEVICE
Filed Nov. 25, 1947 2 Sheets-Sheet 2

INVENTOR.
Donald A. Baird.
BY
Harness and Harris
ATTORNEYS.

Patented May 12, 1953

2,638,119

UNITED STATES PATENT OFFICE 2,638,119

BRAKE HOLDING DEVICE

Donald A. Baird, Detroit, Mich., assignor to Chrysler Corporation, Highland Park, Mich., a corporation of Delaware Application November 25, 1947, Serial No. 787,957

11 Claims. (Cl. 137—598)

This invention relates to a brake control device particularly adapted for use as a no-creep device for motor vehicles having a fluid drive and equipped with a fluid pressure actuated brake system, the device being completely automatic in its method of operation.

The invention relates particularly to a valve device which will automatically hold the brakes applied, under certain conditions, the brake holding valve device being conjointly controlled by two control units, one being a pressure operated switch which is responsive to vehicle and engine speed and the other being a micromatic switch which is responsive to movement of the foot accelerator. This brake holding device is so constructed that the brakes will be held applied only when both of the aforementioned control units are in a predetermined condition.

It is one of the objects of my invention to provide a simple, efficient, no-creep device which will automatically prevent a motor vehicle equipped with a fluid drive from unexpectedly moving forward after the vehicle has been brought to a stop with the engine running and the transmission in gear.

It is a further object of the present invention to provide a brake control device that will hold the vehicle service brakes in an applied position after release of the brake pedal by the vehicle driver, provided the vehicle had been brought to a stop and left in gear with the engine running, or the vehicle speed reduced to a predetermined negligible amount preliminary to coming to a stop.

It is a further object of this invention to provide an anti-creep device for fluid drive vehicles which will be instantaneous in operation and which will not interfere in any way with the normal operation of the vehicle.

It is a further object of this invention to provide a brake holding device that automatically sets the brakes when bringing the vehicle to a stop and automatically releases the brakes when the vehicle driver initiates action to set the car in motion, the brake setting and releasing action being so smooth that the vehicle driver is unaware of the action of the brake holding device.

A further object of this invention is to provide an automatically operative no-creep device which will also function as an anti-roll back or hill-holding device, the device being such that its operation requires no conscious effort on the part of the vehicle operator.

It is a further object of this invention to provide an automatically operable brake holding device which may be easily connected to the standard fluid pressure operated braking system of a motor vehicle without necessitating any major changes or alterations. This device is such that it may be supplied as an accessory for, or as an integral part of, the standard fluid pressure braking system now furnished on most motor vehicles.

It is a further object of this invention to provide an automatically operable brake holding device which makes vehicle driving more pleasant and less tiring due to the fact that the vehicle driver is not required to hold the brakes applied to prevent unintended movement of the vehicle after the vehicle has once been brought to a stop and left in gear with the engine idling. In vehicles equipped with a fluid coupling or fluid transmission this point is of particular significance in that the vehicle may be brought to a stop, left in gear with the engine running, and the vehicle will not move from its stopped position even though the vehicle driver releases the brake foot pedal. When it is desired to subsequently set the vehicle in motion the vehicle driver need only depress the foot accelerator and the brake holding device will be automatically released and the vehicle will smoothly move forward without so-called "freight train" jerkiness.

Another object of this invention is to provide an automatically operable brake holding device having the advantages pointed out above but which is so constructed that it will in no way interfere with the use of the service brakes to retard movement of the vehicle when the vehicle is moving above a predetermined minimum speed.

Another object of this invention is to provide a simple, efficient, inexpensive, foolproof, control valve unit for the brake holding device which may be connected between the master cylinder and the wheel brake cylinders of a fluid pressure operated braking system so as to provide a no-creep device.

Other objects and advantages of my invention will become apparent from the following description taken in connection with the accompanying drawings, in which:

Fig. 1 is a schematic view of a fluid pressure operated braking system and the other parts of a motor vehicle having associated therewith my improved brake holding device;

Fig. 2 is an enlarged, fragmentary, side elevational view, partly in section, of certain of the elements of the brake holding device constituting this invention;

Figure 3:
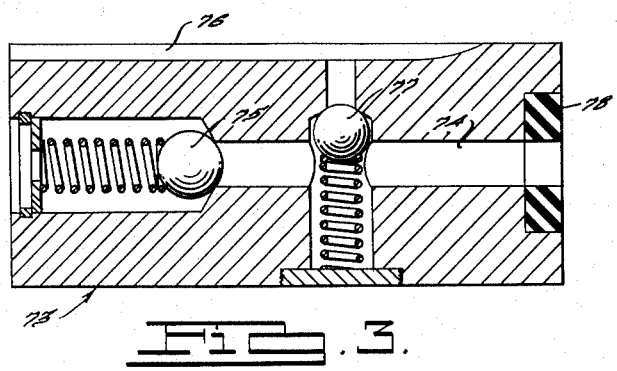
Fig. 3 is a sectional elevational view of a modified form of plunger control valve member intended for use with this brake holding device.

Referring to the drawings in detail, 1 indicates a vehicle engine having the usual carburetor 2 controlled by a throttle valve 3 to permit variation in the amount of fuel fed to the engine. The valve 3 is actuated by an accelerator pedal 4 pivotally mounted in the vehicle driver's compartment and connected to the valve 3 by a linkage rod 5. The engine drives the wheels of the vehicle through the usual change speed gearing, clutch and/or fluid coupling, propeller shaft and differential gearing, as is well known in the art. A fluid coupling 72 has been indicated schematically in Fig. 1.

The braking system of the vehicle is schematically shown in Fig. 1, and comprises a brake master cylinder 6, the piston (not shown) of which is actuated by the pivotally mounted brake pedal 7 through a piston rod 8, said pedal 7 being mounted in the vehicle driver's compartment. Fitted to the outlet end of the brake master cylinder 6 is the solenoid actuated control valve unit 9 of the brake holding device, which unit constitutes this invention. The brake lines include a fluid pressure conduit 10 connected to the outlet end of the valve unit 9 and to a fitting 11 from which supply conduits 12 branch out to supply pressure fluid to the wheel brake units 13 and 14 (only two of which are shown). Each of these wheel brake units comprises an actuating fluid motor or wheel cylinder 15 for the brake shoes 16 whereby the shoes may be moved into braking engagement with the associated brake drum 17 carried by a vehicle wheel (not shown).

The brake holding valve unit 9, interposed between the brake master cylinder 6 and supply conduit 10, provides means whereby pressure fluid can be trapped in the wheel cylinders 15 of the wheel braking units to maintain the brakes applied after braking pressure has been removed from the brake pedal 7 and the pedal has returned to its released position. It will be noted that the valve unit 9 is directly connected to the outlet end of the master cylinder 6 and to the conduit 10 by means of a simple, inexpensive, leakproof, screw connection. Such a connection does not require packing glands or the like and therefore provides a closed brake system that is safe and permanent.

As shown in detail in Fig. 2, the brake holding valve unit 9 has one end directly connected to the outlet end of the master cylinder 6 and the other end connected to the brake line conduit 10. Valve unit 9 comprises a substantially cylindrical casing member 18 about a portion of which is mounted a solenoid coil 30. Casing 18 is pierced by a longitudinally extending bore 20 and mounted in the bore 20 of the casing member 18 is the plunger control valve member 40. Plunger member 40 constitutes an armature which is adapted to reciprocate in the bore 20 of the casing 18. Snap ring 19 and casing partition or end member 21 limit the reciprocatory movement of the plunger member 40 in the bore 20 of the casing member 18. Casing end member 21 is provided with a raised lip portion 22 which constitutes a valve seat adapted to be engaged by the resiliently faced end portion 23 of the plunger control valve 40 when the plunger valve member 40 is moved against the end member 21. Plunger valve member 40 is of such material that it is responsive to energization of the solenoid 30. Energization of solenoid 30 moves plunger valve member 40 towards end member 21 and lip 22 seals against the resiliently faced portion 23 of valve member 40. Plunger valve 40 is loosely mounted in the bore 20 of the casing 18 and when the plunger member 40 is not being held against the lip 22 of the end member 21 then there is sufficient clearance between the periphery of the plunger and the walls of the casing bore 20 to provide a passageway which allows pressure fluid to pass directly from the master cylinder 6 to the conduit 10 without going through the spring-pressed by-pass and relief valve assembly 25 mounted in the bore 24 of the plunger valve member 40. Plunger valve member 40 is provided with the longitudinally extending bore 24 so as to afford a passageway for the flow of pressure fluid to the wheel brakes when the plunger valve member 40 is being held in seated engagement with the lip 22 of the end member 21. The plunger bore 24 is enlarged at one end to provide a chamber to receive the combination spring-pressed by-pass and relief valve assembly 25. This valve assembly 25 comprises a cup-shaped combination valve and valve seat member 26, having an orifice 26' therethrough, the orifice being adapted to be normally closed by the spring-pressed, ball-type, relief valve 27. The valve seat member 26 has a radially extending flange portion 28 which is adapted to be urged against the resiliently faced seat portion 29 of the plunger member 40 by the spring 31. The spring-pressed flange 28 and the seat 29 constitute a by-pass valve for plunger control valve 40 when the control valve is in closed position.

When the solenoid 30 is de-energized the plunger valve member 40 is not held against the sealing lip 22 by electro-magnetic forces and this permits pressure fluid to flow to the wheel cylinders 15 from the master cylinder 6 through the passageway between the casing bore walls and the plunger valve member and then through the open control valve port at valve seat 22. If the pressure from the master cylinder forces the plunger member 40 against the sealing lip 22 then pressure fluid can still pass to the wheel cylinders through the by-pass valve of the valve assembly 25. The fluid pressure from the master cylinder 6 will then raise the flange portion 28 of the member 26 off the seat portion 29, against the pressure exerted by the spring 31, and the pressure fluid will pass through the plunger bore 24 to the brake lines. When solenoid 30 is energized electro-magnetic forces urge the plunger valve member 40 against the lip 22 and then with the control valve closed the pressure fluid must pass through the by-pass valve of the valve assembly 25 of the plunger valve member 40. If the plunger valve member 40 traps pressures in the brake lines 10, 12 in excess of the pressure exerted by the spring 33 of the ball-type relief valve 27, then relief valve 27 is backed off its seat until the pressure trapped in the brake lines has been reduced to the value desired to be maintained in the lines for brake holding purposes. It has been found that approximately 120 pounds per sq. in. pressure in the brake lines is adequate to prevent creep of a motor vehicle equipped with a fluid drive mechanism yet such a trapped braking pressure is not enough to produce an objectionable deceleration when the vehicle is being brought to a stop. A trapped braking pressure of 120 pounds will also release rapidly enough in starting up to prevent a "freight train" start.

From the above description it is thought that it is obvious that the by-pass valve seat 26 of the combination valve assembly 25 provides means which permits increasing of the trapped brake line pressure after the valve 40 has been closed due to energization of the solenoid coil 30.

The circuit for controlling the solenoid 30 is shown in Fig. 1, this circuit being that described and claimed in the application of Robert L. Mayrath, Serial No. 786,277, filed November 15, 1947. One end of the solenoid coil 30 is connected by a conductor 51 to a micromatic switch 52 controlled by movement of the foot accelerator 4. The foot accelerator switch 52 is such that this switch is closed only when the accelerator pedal is in released, closed throttle position. At all other accelerator positions the accelerator switch 52 is open and therefore the solenoid 30 cannot be energized whenever the foot accelerator is depressed from throttle closed position. The accelerator switch 52 is connected to ground through a source of electrical energy such as battery 53. The other end of solenoid coil 30 is connected by conductor 54 to one contact 55 of vacuum governor switch 56. The vacuum governor switch 56 comprises a two-piece, metallic casing 60 having a flexible, resilient diaphragm 61 interposed between the sections of the casing. The chamber 62 on one side of the diaphragm 61 is connected to the atmosphere through ports 60'. The chamber 64 on the other side of the diaphragm 61 is connected by means of tube 65 to the intake manifold 66 of the engine 1. The diaphragm 61 of the vacuum switch 56 mounts a switch contact 63 adapted to engage the contact 55 when the vacuum in the chamber 64 on the intake side of the diaphragm has been reduced to such a degree that the spring 68 can urge the diaphragm contact 63 outwardly. Spring 68 is of conductive material and has one end connected to the diaphragm contact 63 while the other end bears against the base section of metallic casing 60. Spring 68 normally urges contact 63 into engagement with contact 55. When contacts 55 and 63 are closed vacuum switch 56 provides a lead to ground through the spring 68 and casing 60.

The brake holding device constituting this invention makes use of the fact that when a motor vehicle equipped with a fluid coupling is stopped, or nearly stopped, and left in gear with the clutch engaged, the engine idling and the throttle closed, then the intake manifold vacuum is approximately three inches of mercury less than when the transmission is in neutral with the engine idling. This difference in vacuum being due to the drag of the coupling runner and other connected elements being driven by the coupling runner as a result of the transmission being in gear. With engine speeds at or above the speed of free idle of the engine the electrical circuit for the solenoid 30 is broken due to the contacts of the vacuum operated switch 56 being open, even though the throttle switch 52 may be closed. As the engine speed drops below the speed of free engine idle, the manifold vacuum also drops and the vacuum switch contacts are then closed. If the throttle is also closed at this time the throttle switch 52 will be made and the circuit for the solenoid 30 is completed. Thus, it will be seen that vacuum operated switch 56 is such that when the engine speed has been reduced to a speed less than that of free engine idle then the vacuum on the intake side of the diaphragm 61 will have been reduced to such a degree that spring 68 will close the diaphragm switch and connect contact 55 to ground. It is obvious from a consideration of the series circuit herein described that the foot accelerator switch 52 and the diaphragm operated vacuum switch 56 must both be closed in order to permit energization of the solenoid 30 to close valve 40. The accelerator switch 52 will be closed only when the throttle is closed whereas the vacuum switch will be closed only when the vehicle speed has been reduced to such a point that the engine speed is below the speed of free engine idle. The two control switches will be closed at the same time only when the vehicle has been brought to a stop and left in gear with the engine idling and the throttle valve closed or when the vehicle speed has been reduced to less than 3 or 4 miles per hour with the engine running and the throttle valve closed. When the above specified conditions exist then the pressure trapped in the brake lines will be only as high as the highest brake pressure applied after the valve member 40 has been closed and in no case will the pressure trapped in the brake lines exceed the limiting pressure of the solenoid relief valve 27 which is controlled by the compression spring 33. As previously mentioned a relief valve spring pressure of approximately 120 pounds per square inch has been found most satisfactory for motor vehicles on which this device has been installed.

The no-creep device herein disclosed functions as follows: When the vehicle is traveling at any speed equal to or greater than the speed of free engine idle then the vacuum switch 56 is open and regardless of the condition of the accelerator switch 52 the circuit through the solenoid 30 is broken and the brake system functions in the normal manner due to the solenoid control valve member 40 being open. With solenoid 30 deenergized the plunger valve member 40 is not held against the valve seat 22 for the brake shoe springs 71 will force the pressure fluid back through the brake lines to the master cylinder and hold the valve member 40 off the seat 22. When the speed of the vehicle drops below 4 miles per hour the contacts of the vacuum switch 56 will close but the solenoid 30 still will not be energized unless at the same time that these vacuum switch contacts are closed the throttle valve is also closed. With the throttle valve switch 52 closed and the vacuum switch contacts 55 and 63 closed the solenoid coil 30 will become energized and control valve member 40 will close and trap brake fluid in the brake lines and hold the brakes applied with a pressure of not exceeding approximately 120 pounds per square inch. This pressure in the brake lines is such as to prevent creep of the vehicle in the event the vehicle is left in gear with the engine running while stopped. When it is desired to accelerate the vehicle the driver need only depress the accelerator pedal and this will automatically open the accelerator switch and simultaneously deenergize the solenoid 30 and open the control valve 40. The accelerator pedal linkage is preferably adjusted so that the switch 52 will be opened upon initial depression of the accelerator pedal 4 and before it has moved the throttle valve 3 out of closed throttle position. This may be accomplished by providing a slight amount of lost motion in the linkage mechanism connecting accelerator pedal 4 with throttle valve 3. The opening of the control valve member 40 releases the trapped fluid in the brake lines and the vehicle can then be accelerated as the accelerator pedal is further depressed. It is obvious that if the throttle valve 3 is closed and the vehicle speed drifts down below 4 miles per hour so as to close the vacuum switch contacts, that still the brakes will not be set unless the brake pedal is depressed to stop the vehicle or slow it down for there will be insufficient pressure in the brake lines to move the brake shoes against the brake drums. Consequently, a vehicle may coast at a very slow speed without having the brakes applied and immediately upon depression of the foot accelerator the vehicle can be accelerated without any interference from the no-creep device. As the brakes are held applied when the vehicle is brought to a stop it is obvious how this device functions as a hill holding device as well as a no-creep device.

Fig. 3 shows a modified form of plunger control valve member 73 adapted to be mounted for reciprocation in the bore 20 of the casing 18. Plunger member 73 is pierced by a longitudinally extending bore 74. A one-way spring-pressed, ball-type relief valve 75 is mounted in one end of the bore 74. This relief valve 75 is adapted to release pressure fluid from the brake lines when the control valve member 73 has been moved to closed position and the trapped pressure in the brake lines exceeds that necessary to hold the brakes applied. Plunger member 73 is also provided with a longitudinally extending passageway 76 which extends part way through the plunger 73 and communicates with the bore 74 through a one-way, spring-pressed, ball-type, by-pass valve 77. This by-pass valve 77 provides means which permits increasing the pressure in the brake lines after the plunger control valve member 73 has been moved into sealing engagement with the valve seat 22 of the casing 18. Plunger member 73 has a resiliently faced portion 78 adapted to engage the casing lip portion 22 when plunger member 73 is moved to closed control valve position.

Figure 4:
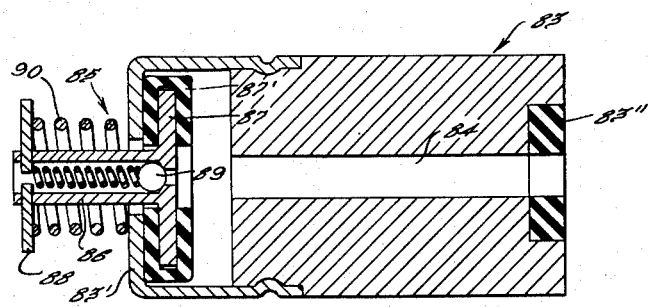
Fig. 4 is a sectional elevational view of another modified form of plunger control valve member intended for use with this brake holding device.

Fig. 4 shows another modified form of plunger control valve member 83 adapted for reciprocatory mounting in the bore 20 of the casing 18. Plunger member 83 is pierced by a longitudinally extending bore 84. One end of bore 84 is enlarged to receive a combination relief and by-pass valve assembly 85. Valve assembly 85 comprises a cylindrical shell member 86 having radially extending flanges 87 and 88 at each end thereof. Mounted in the bore of the cylindrical portion of the shell member 86 is a one-way, spring-pressed, ball-type, relief valve 89. Relief valve 89 provides means for relieving the pressure trapped in the brake lines after plunger control valve member 83 has been moved to closed position with the resilient sealing portion 83'' engaging the casing lip 22. Flange portion 87 of member 86 includes a portion covered with a resilient material 87' which latter portion is adapted to be normally held in sealing engagement with a valve seat portion 83' formed on the plunger valve member 83. Spring 90 extends between the portion 83' of the plunger member 83 and the flange 88 of the cylindrical shell member 86. Spring 90 normally retains the by-pass valve 83', 87' closed but fluid pressure can open this by-pass valve, after the plunger valve member 83 has been moved to closed position, so as to permit increasing of the pressure in the brake lines after the control valve has been closed.

Figure 5:
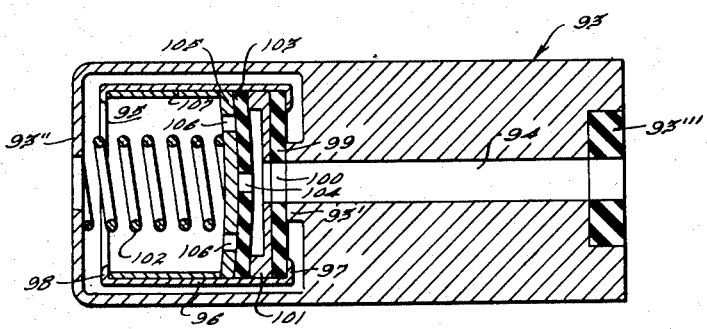
Fig. 5 is a sectional elevational view of still another modified form of plunger control valve member intended for use with this brake holding device.

Fig. 5 shows another modified form of plunger control valve 93 adapted for reciprocatory mounting in the bore 20 of the casing 18. Plunger member 93 is pierced by a longitudinally extending bore 94. One end of bore 94 is enlarged to receive a combination relief and by-pass valve assembly 95. Valve assembly 95 comprises a cylindrical shell member 96 having inwardly turned, radially extending, flanges 97 and 98 at each end thereof. A pierced, washer-like member 99 of resilient material, having an orifice 100 therein, is mounted in the bore of shell member 96 between flange 97 and hollow spacer member 101. The resilient member 99 is adapted to be normally held against the raised lip portion 93' of the plunger member 93 by means of a compression spring 102 which extends between the flange 93'' of plunger member 93 and plate valve member 105 carried by shell member 96. An arched, resilient plate valve member 103, having an opening 104 through it, is mounted in the bore of the shell member 96, between the spacer member 101 and the plate valve member 105. The arched plate valve member 105, which is pierced by openings 106, is mounted in the bore of the shell member 96 adjacent the resilient plate valve member 103. A cylindrical spacing sleeve 107 is positioned within shell 96 so as to extend between the flange 98 of the shell 96 and the plate valve member 105. Sleeve 107 holds the various members within shell 96 in relatively fixed positions.

The plate valve member 105 normally covers the opening 104 through the plate member 103 and plate valve member 103 normally covers the openings 106 in member 105. When plunger control valve member 93 has been moved to closed position with resilient portion 93''' in sealing engagement with the lip portion 22 of the casing 18 then additional pressure fluid can be forced into the brake lines through the by-pass plate valve 103 for the pressure fluid will bend the resilient plate 103 inwardly away from the pierced plate 105 and uncover the openings 106 in plate 105. Pressure fluid can then flow from the master cylinder through openings 106, 104 and 100 into the bore 94 and thence to the brake wheel cylinders. If the pressure trapped in the brake lines by the closing of plunger control valve 93 is more than that required for brake holding purposes then the valve assembly 95 functions as a relief valve and the entire valve assembly 95 will be backed off the valve seat 93' against the pressure exerted by the spring 102. When the pressure trapped in the brake lines has been reduced to slightly less than the pressure exerted by the spring 102 then valve assembly 95 will be seated on valve seat 93' and the brakes will be held applied.

I claim:

1. A control valve adapted to be mounted in the fluid conduit extending between the master cylinder and a wheel cylinder of a fluid pressure operated brake system of a motor vehicle providing means to trap pressurized fluid in the brake system of the motor vehicle so as to prevent creep of the vehicle comprising a casing having a bore therethrough providing a pressure fluid conduit, said casing including a wall extending across said casing bore having an aperture therein providing a casing valve port and an encircling valve seat, an armature member concentrically mounted within said casing bore for reciprocatory movement longitudinally of said casing bore, said armature having portions of its periphery spaced from the walls of said casing bore to provide fluid conduit means therebetween that extend longitudinally of the casing bore, said armature including other portions arranged to be seated on the casing valve seat to close off flow through said casing bore and casing valve port whereby the armature provides a plunger control valve for said casing bore, solenoid means mounted on said casing adapted to be energized to move the said other portions of the armature plunger valve into engagement with the casing valve seat, a bore through said armature plunger valve connecting said casing bore and said casing valve port, said bore in said armature plunger valve having a first valve associated therewith so as to prevent flow of fluid from the casing bore through the plunger valve bore towards said casing valve port while permitting fluid flow through said plunger valve bore in the opposite direction, and a second valve associated with the bore in said armature plunger valve arranged to prevent flow of fluid in a direction from the casing valve port through said plunger valve into said casing bore while permitting fluid flow through the plunger valve bore in the opposite direction.

2. A control valve for trapping fluid in the fluid pressure operated brake system of a motor vehicle to prevent creeping of the vehicle comprising a casing having a bore therethrough providing a pressure fluid conduit, said casing including a wall extending across said casing bore having an aperture therein providing a casing valve port and an encircling valve seat, an armature member concentrically mounted within said casing bore for reciprocatory movement longitudinally of said casing bore, said armature having portions of its periphery spaced from the walls of said casing bore to provide fluid conduit means therebetween that extend longitudinally of the casing bore, said armature including other portions arranged to be seated on the casing valve seat to close off flow through said casing bore and casing valve port whereby the armature provides a plunger control valve for said casing bore, solenoid means mounted on said casing adapted to be energized to move the said other portions of the armature plunger valve into engagement with the casing valve seat, a bore through said armature plunger valve connecting said casing bore and said casing valve port, said bore in said armature plunger valve having a first valve associated therewith so as to prevent flow of fluid from the casing bore through the plunger valve bore towards said casing valve port while permitting fluid flow through said plunger valve bore in the opposite direction, and a second valve associated with the bore in said armature plunger valve arranged to prevent flow of fluid in a direction from the casing valve port through said plunger valve into said casing bore while permitting fluid flow through the plunger valve bore in the opposite direction.

3. A control valve for a pressure fluid conduit comprising a casing having a bore therethrough providing a pressure fluid conduit, said casing including a wall extending across said casing bore having an aperture therein providing a casing valve port and an encircling valve seat, an armature member concentrically mounted within said casing bore for reciprocatory movement longitudinally of said casing bore, said armature having portions of its periphery spaced from the walls of said casing bore to provide fluid conduit means therebetween that extend longitudinally of the casing bore, said armature including other portions arranged to be seated on the casing valve seat to close off flow through said casing bore and casing valve port whereby the armature provides a plunger control valve for said casing bore, solenoid means mounted on said casing adapted to be energized to move the said other portions of the armature plunger valve into engagement with the casing valve seat, a bore through said armature plunger valve connecting said casing bore and said casing valve port, said bore in said armature plunger valve having a first valve associated therewith so as to prevent flow of fluid from the casing bore through the plunger valve bore towards said casing valve port while permitting fluid flow through said plunger valve bore in the opposite direction, and a second valve associated with the bore in said armature plunger valve arranged to prevent flow of fluid in a direction from the casing valve port through said plunger valve into said casing bore while permitting fluid flow through the plunger valve bore in the opposite direction.

4. A control valve for trapping fluid in certain of the closed conduits of a fluid pressure operated control system comprising a casing having a bore therethrough providing a pressure fluid conduit, said casing including a wall extending across said casing bore having an aperture therein providing a casing valve port and an encircling valve seat, an armature member concentrically mounted within said casing bore for reciprocatory movement longitudinally of said casing bore, said armature having portions of its periphery spaced from the walls of said casing bore to provide fluid conduit means therebetween that extend longitudinally of the casing bore, said armature including other portions arranged to be seated on the casing valve seat to close off flow through said casing bore and casing valve port whereby the armature provides a plunger control valve for said casing bore, solenoid means mounted on said casing adapted to be energized to move the said other portions of the armature plunger valve into engagement with the casing valve seat, a bore through said armature plunger valve connecting said casing bore and said casing valve port, said bore in said armature plunger valve having a first valve associated therewith so as to prevent flow of fluid from the casing bore through the plunger valve bore towards said casing valve port while permitting fluid flow through said plunger valve bore in the opposite direction, and a second valve associated with the bore in said armature plunger valve arranged to prevent flow of fluid in a direction from the casing valve port through said plunger valve into said casing bore while permitting fluid flow through the plunger valve bore in the opposite direction, said first valve providing a pressure relief valve to control the pressure of the fluid trapped in the fluid pressure operated brake system when the plunger control valve is engaged with the casing valve seat and said second valve providing a by-pass valve to permit increase of the pressure of the fluid trapped in the pressure fluid operated brake system after said plunger control valve is engaged with the casing valve seat.

5. A control valve for trapping fluid in the fluid pressure operated brake system of a motor vehicle to prevent creeping of the vehicle comprising a casing having a bore therethrough providing a pressure fluid conduit, said casing including a wall extending across said casing bore having an aperture therein providing a casing valve port and an encircling valve seat, an armature member concentrically mounted within said casing bore for reciprocatory movement longitudinally of said casing bore, said armature having portions of its periphery spaced from the walls of said casing bore to provide fluid conduit means therebetween that extend longitudinally of the casing bore, said armature including other portions arranged to be seated on the casing valve seat to close off flow through said casing bore and casing valve port whereby the armature provides a plunger control valve for said casing bore, solenoid means mounted on said casing adapted to be energized to move the said other portions of the armature plunger valve into engagement with the casing valve seat, a bore through said armature plunger valve connecting said casing bore and said casing valve port, said bore in said armature plunger valve having a first one-way valve mounted therein arranged to normally close off said bore in the plunger valve while permitting pressurized fluid of a predetermined pressure to flow from said casing bore through said plunger valve bore to said case valve port and a second one-way valve mounted in said plunger valve bore arranged to normally close off said bore in the plunger valve while permitting pressurized fluid of a predetermined pressure on the downstream side of said valve port to flow from said valve port through said plunger valve bore to said casing bore.

6. In a pressure fluid operated control system including a pressure fluid supply, a pressure fluid operated motor and conduits connected therebetween, a control valve mounted in the conduit means between said pressure fluid supply and said motor comprising a casing having a bore therethrough, a wall in said casing pierced by said bore and arranged to provide a casing valve port surrounded by a casing valve seat, an armature mounted in the casing bore for movement therealong, said armature having portions arranged to be engaged with said casing valve seat to close said casing valve port and other portions arranged to permit flow of pressure fluid through said casing bore and casing valve port when said armature is disengaged from said valve seat, electrically operated means to effect engagement of said armature and casing valve seat, and a bore through said armature arranged to connect said casing bore and said casing valve port, said armature having a valve seat arranged about said armature bore and a combination pressure fluid by-pass and pressure fluid relief valve mounted on said armature valve seat, said combination valve being arranged to provide a means permitting increase in the pressure of the pressure fluid trapped on one side of the valve during engagement of the armature and casing valve seat, said combination valve also permitting relief of the pressure trapped on said one side of the valve during engagement of the armature and casing when the pressure of the trapped pressure fluid exceeds a predetermined value.

7. In a pressure fluid operated brake system as set forth in claim 6, a combination by-pass and relief valve comprising a flanged, cup-shaped by-pass valve member mounted on said armature valve seat, spring means urging said by-pass valve against said armature valve seat, said by-pass valve being adapted to be raised off said armature valve seat to permit increase in the pressure trapped by seating of the armature on said armature valve seat, and a spring-pressed pressure relief valve carried by said by-pass valve member adapted to be unseated to relieve the pressure trapped when the pressure trapped by seating of the armature valve exceeds a predetermined value.

8. In a pressure fluid operated brake system as set forth in claim 6, a combination by-pass and relief valve comprising a flanged, cylindrical, by-pass valve member having a flange portion mounted on said armature valve seat, spring means retaining said valve member on said armature valve seat, said by-pass valve being adapted to be raised off said armature valve seat to permit increase in the pressure trapped by seating of the armature on said armature valve seat, and a spring-pressed pressure relief valve mounted in the bore of said cylindrical by-pass valve member and adapted to be unseated when the pressure trapped by seating of the armature valve exceeds a predetermined value.

9. In a pressure fluid operated brake system as set forth in claim 6, a combination by-pass and relief valve comprising a multiple plate valve unit, and spring means retaining said plate type valve unit on said valve seat, said plate type valve unit including a pierced, resilient plate valve member and a pierced, rigid plate valve member, said plate valve members being in face-to-face contact and cooperating to provide means permitting increase of the pressure trapped by seating of the armature valve on said armature valve seat and means adapted to relieve the pressure trapped by the seating of the armature valve when the trapped pressure exceeds a predetermined value.

10. In a fluid pressure operated system including closed conduit lines, a valve device adapted to be mounted in said lines for trapping pressure fluid in certain of the lines comprising a casing having a pressure fluid passageway extending therethrough, a partition formed with an aperture and an encircling valve seat extending across said passageway, an armature type control valve member reciprocatably mounted in said passageway and adapted to be seated on said valve seat to close off normal fluid flow through said passageway, said control valve member having a first conduit means associated therewith permitting pressure fluid to flow through said passageway when said valve member is unseated, said control valve member having a second conduit means extending therethrough adapted to provide a means to by-pass fluid around said control valve member and through said passageway when said valve member is seated on said valve seat, a first one-way by-pass valve associated with said second conduit means arranged to permit an increase in the pressure fluid trapped in certain of the lines when said control valve member is seated, a second one-way pressure relief valve mounted in said passageway and arranged such that the pressure fluid trapped in certain of said lines when said control valve member is seated will never exceed a predetermined pressure, solenoid means operable to move said control valve member to its seated position and means adapted to normally urge said control valve member off said valve seat.

11. A valve unit for a fluid conduit comprising a casing having a bore extending longitudinally therethrough, a valve port extending across one end of said casing bore; an electromagnetically responsive plunger valve member reciprocably mounted in said casing bore and adapted to be moved into engagement with said one end of said casing bore to close said valve port and prevent the passage of fluid through the valve unit, a bore extending longitudinally through said plunger valve member, a pair of valves mounted in said plunger valve bore, one of said valves being arranged to permit fluid flow through said plunger bore towards said valve port while preventing fluid flow in the opposite direction so as to provide means for bypassing fluid through said casing when said plunger valve member is engaged with said one end of the casing bore to close off said valve port, and the other valve being arranged to permit fluid flow through said plunger bore away from said valve port while preventing fluid flow in the opposite direction so as to function as a pressure relief valve to limit the pressure of the fluid in the valve casing downstream of said plunger valve member when said plunger valve member is closing off said valve port, and an electro-magnetic solenoid mounted on said casing and operable to effect movement of said plunger valve member in said casing bore towards said valve port.

DONALD A. BAIRD.

References Cited in the file of this patent

UNITED STATES PATENTS

| Number | Name | Date |
| --- | --- | --- |
| 2,133,538 | Darling | Oct. 18, 1938 |
| 2,148,190 | Darling | Feb. 21, 1939 |
| 2,287,562 | Pennington | June 23, 1942 |
| 2,414,409 | Goepfrich | Jan. 14, 1947 |

FOREIGN PATENTS

| Number | Country | Date |
| --- | --- | --- |
| 557,981 | Great Britain | Dec. 14, 1943 |